US005693732A

United States Patent [19]

Sharma et al.

[11] Patent Number: 5,693,732
[45] Date of Patent: Dec. 2, 1997

[54] LATEX BINDER FOR PAPER COATING FORMULATIONS HAVING IMPROVED STRENGTH AND BLISTER RESISTANCE

[75] Inventors: Satish C. Sharma, Stow; Charles M. Kausch; Ronald D. Mohan, both of Akron; Raymond J. Weinert, Macedonia, all of Ohio

[73] Assignee: GenCorp. Inc., Fairlawn, Ohio

[21] Appl. No.: 584,573

[22] Filed: Jan. 8, 1996

[51] Int. Cl.$^6$ ............ C08F 26/10; C08F 26/08; C08F 12/24; C08F 20/06
[52] U.S. Cl. .......... 526/263; 526/265; 526/312; 526/313; 526/318.1; 526/318.6; 524/548; 524/555
[58] Field of Search .......... 526/263, 265, 526/312, 313, 318.1, 318.6; 524/548; 529/555

[56] References Cited

U.S. PATENT DOCUMENTS

| | | | |
|---|---|---|---|
| 2,982,682 | 5/1961 | Matlin et al. | 154/101 |
| 3,047,548 | 7/1962 | Garrett | 260/80.7 |
| 3,119,731 | 1/1964 | Ströle et al. | 162/164 |
| 3,404,114 | 10/1968 | Snyder et al. | 260/29.6 |
| 3,487,032 | 12/1969 | Guziak et al. | 260/8 |
| 3,957,710 | 5/1976 | Rohmann et al. | 260/29.6 |
| 4,030,970 | 6/1977 | Tominaga et al. | 162/168 |
| 4,121,966 | 10/1978 | Amano et al. | 162/164 |
| 4,189,345 | 2/1980 | Foster et al. | 162/168 |
| 4,278,583 | 7/1981 | Sekiya | 260/29.7 |
| 4,293,629 | 10/1981 | Shaw et al. | 430/64 |
| 4,358,403 | 11/1982 | Distler et al. | 524/745 |
| 4,425,405 | 1/1984 | Murakami et al. | 428/342 |
| 4,426,470 | 1/1984 | Wessling et al. | 524/35 |
| 4,429,074 | 1/1984 | Mishiba et al. | 524/819 |
| 4,657,966 | 4/1987 | Mallya | 524/747 |
| 4,806,207 | 2/1989 | Monzon et al. | 162/168.1 |
| 4,895,620 | 1/1990 | Ko et al. | 162/138 |
| 4,950,711 | 8/1990 | Suwala et al. | 524/819 |
| 5,093,449 | 3/1992 | Cronin et al. | 526/318 |
| 5,139,614 | 8/1992 | dePierne et al. | 162/135 |
| 5,156,718 | 10/1992 | Neubert | 162/145 |
| 5,286,783 | 2/1994 | Hisaki et al. | 526/265 |

OTHER PUBLICATIONS

Grant & Mashk's Chemical Dictionary, p. 428, McGraw Hill N.Y. Fifth Edition.

Primary Examiner—Peter A. Szekely
Attorney, Agent, or Firm—Robert F. Rywalski; Larry R. Meenan

[57] ABSTRACT

A paper coating formulation and a process for making a paper coating formulation having an improved strength and blister resistance including an aqueous medium having dispersed therein a functionally effective amount of a finely divided mineral filler and a latex binder containing copolymerized acid functional and amine functional monomers in each polymer molecule.

17 Claims, No Drawings

LATEX BINDER FOR PAPER COATING FORMULATIONS HAVING IMPROVED STRENGTH AND BLISTER RESISTANCE

FIELD OF THE INVENTION

This invention relates to a latex binder for paper coating formulations having improved strength and blister resistance and a method of preparing the latex binder.

BACKGROUND OF THE INVENTION

High blister resistance and good coating strength are two significant requirements for coated paper used in web offset printing. With the advent of multi-color offset printing and high printing speeds desired to increase productivity, operating temperatures used for print drying (heat-set) ovens have increased. This has further increased the blister resistance requirement for web offset printing paper.

Styrene-butadiene, vinyl acetate (co)polymers and acrylics, including vinyl acrylics, are the three most commonly used synthetic latex binders in paper coatings. Styrene-butadiene and vinyl acetate (co)polymers are used widely because of their lower cost. In general the styrene-butadiene binders provide higher coating strength than vinyl acetate (co)polymers, but vinyl acetate (co)polymers give higher blister resistance. There is a significant need for styrene-butadiene binders which provide significant improvement in blister resistance of coated paper without a significant loss in paper coating strength.

It is well known that for styrene-butadiene binders the blister resistance of coated paper increases as the gel content of the binder is lowered. The coating strength on the other hand decreases when the gel content is lowered. As a consequence, in order to improve one of these two properties (e.g., blister resistance), some sacrifice in the other property (e.g. strength) must be made.

Blister formation in coated paper occurs at relatively high temperature, greater than 150° C., and is a consequence of the presence of water in the paper. When the water vapors generated in the paper at high temperature cannot escape through the coating, the stresses generated exceed the cohesive strength of the paper and blisters result. A number of studies have indicated that blister resistance can be improved by providing a binder that has increased melt flow. It is, however, not possible to have polymers which have sufficiently high covalently bonded gel to provide good strength and have good melt flow at the same time to provide high blister resistance.

An object of the present invention is to provide paper coating latices, particularly styrene-butadiene latices, containing small amounts of functional monomer pairs capable of forming thermally labile bonds, thereby enabling a variation in the apparent gel of the latex binder as a function of temperature. Yet another object of the present invention is to provide paper coating latices containing in polymerized form small amounts of copolymerized acid functional and amine functional monomers. Still another object of the present invention is to provide paper coating latices that contain both the acid monomer and the amine monomer units in each polymer molecule. Another object of the present invention is to provide paper coating latices, particularly styrene butadiene latices, having low gel and therefore good melt flow at high temperatures for high blister resistance and having high gel and, therefore good coating strength at lower temperatures.

SUMMARY OF THE INVENTION

Briefly, according to this invention there is provided a latex binder for paper coating formulations having improved strength and blister resistance. The latex binder includes, in polymerized form, an aliphatic conjugated diene monomer, monoolefinic monomer, acid functional monomer and an amine functional monomer wherein each polymer molecule of the latex binder contains copolymerized acid functional and amine functional monomers. The acid functional monomer may include vinyl acids and vinyl phenols. Examples of acid functional monomers include (meth)acrylic acid, p-hydroxy styrene and mixtures thereof. The amine functional monomer may include vinylpyridines, vinylpyrrolidones, alkylamino alkylesters and vinylbenzylamine. Examples of amine functional monomers include 2-vinylpyridine, 4-vinylpyridine and 2-methyl-5-vinylpyridine, 1-vinyl-2-pyrrolidone, dimethylaminoethylmethacrylate and diethylaminoethylmethacrylate and mixtures thereof.

The paper coating formulation includes an aqueous medium having dispersed therein a functionally effective amount of a finely divided mineral filler and the latex binder.

The latex binder for paper coating formulations may be prepared by copolymerizing a monomeric mixture including an acid functional monomer, an amine functional monomer, a conjugated diene monomer and alkenyl aromatic monomer; and controlling the pH of the polymerization reaction between about 5 to about 8 to provide a latex polymer binder containing copolymerized acid functional and amine functional monomers in each polymer molecule. The pH of the polymerization reaction may be controlled by adding either a base or a buffer before initiation of the polymerization reaction.

DETAILED DESCRIPTION OF THE PREFERRED EMBODIMENTS

The latex binder in accordance with the present invention is obtainable by copolymerization of an aliphatic conjugated diene monomer, monoolefinic monomer, acid functional monomer and amine functional monomer.

The aliphatic conjugated diene monomer generally contains from about 4 to about 8 carbon atoms, and desirably from about 4 to about 6 carbon atoms. Examples of specific diene monomers include piperylene, isoprene, 2,3-dimethyl-1,3-butadiene and the like and preferably, 1,3-butadiene. Mixtures of two or more conjugated dienes may also be used. The aliphatic conjugated diene monomers are used in an amount of about 25 to about 75%, preferably about 30 to about 60% by weight of the total amount of monomer added.

The monoolefinic monomers are alkenyl aromatic compounds having from about 8 to about 12 total carbon atoms. Examples of specific alkenyl aromatic compounds include α-methyl styrene, p-tertiary butyl styrene, methyl vinyl toluene, p-vinyl toluene, 3-ethyl styrene and the like, with styrene being preferred. Mixtures of two or more alkenyl aromatic compounds may also be used. The monoolefinic monomers are used in an amount of about 30 to about 75%, preferably about 35 to about 70% by weight of the total amount of monomer added.

The acid functional monomers include various vinyl acids and vinyl phenols. Examples of specific vinyl acids include (meth)acrylic acid. Examples of specific vinyl phenols include p-hydroxy styrene. Mixtures of two or more acid functional monomers may also be used. The acidic functional monomers are used in an amount of about 0.5 to about 10%, preferably about 1 to about 8% by weight of the total amount of monomer added.

The amine functional monomers include various vinylpyridines, vinylpyrrolidones, alkylamino alkylesters and vinylbenzylamine. Examples of specific vinylpyridines include 2-vinylpyridine, 4-vinylpyridine and 2-methyl-5-vinylpyridine. Examples of specific vinylpyrrolidones include 1-vinyl-2-pyrrolidone. Examples of specific alkylamino alkylesters include dimethylaminoethyl methacrylate and diethylaminoethyl methacrylate. Mixtures of two or more amine functional monomers may also be used. The amine functional monomers are used in an amount of about 0.5 to about 10%, preferably about 1 to about 5% by weight of the total amount of monomer added.

Other conventional monomers that can optionally be utilized in conventional amounts include alkyl(meth)acrylate, vinyl cyanides and vinyl halides including vinyl chloride and the like.

The above monomers are polymerized in the presence of water to form the latex binder of the present invention using conventional emulsion polymerization techniques except as otherwise indicated. Free radical initiators, optional chain transfer agents, various emulsifiers, chelating agents and the like can be used as set forth in U.S. Pat. No. 5,166,259 to Schmeing and White, incorporated herein by reference.

The free radical initiators utilized to polymerize the various monomers include sodium persulfate, ammonium persulfate, potassium persulfate and the like. Other free radical initiators can be utilized which decompose or become active at the polymerization temperature such as various peroxides, e.g., cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxidicarbonate, various azo initiators such as azobisdimethylvaleronitrile, 2,2'-azobisisobutyronitrile, 2,2'-azobis(2-amidinopropane) dihydrochloride, 2,2'-azobis-2-methylbutyronitrile, 2,2'-azobis(methylisobutyrate), and the like and mixtures thereof. The amount of the free radical initiator is generally from about 0.1 to 5, and preferably, from about 0.9 to 2 parts by weight per 100 parts by weight of the total amount of monomers added.

Optional chain transfer agents include mercaptans such as the alkyl and/or aralkyl mercaptans having from about 8 to about 18 carbon atoms and preferably from about 12 to about 14 carbon atoms. The tertiary alkyl mercaptans having from about 12 to about 14 carbon atoms are highly preferred. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof. The amount of the chain transfer agent utilized is from about 0.2 to 5, and preferably, from about 0.3 to 4 parts by weight per 100 parts by weight of the total amount of monomers added.

The emulsifiers can generally be any surfactant, soap, or the like which are well known in the art and stable at the pH of the latex in accordance with the present invention. Examples of specific emulsifiers include alkyl sulfates, alkyl sulfosuccinates, alkyl aryl sulfonates, α-olefin sulfonates, fatty or rosin acid salts, nonyl or octyl phenol reaction products of ethylene oxide and the like. The alkyl portion of the various emulsifiers generally has from about 8 to about 18 carbon atoms. Examples of specific surfactants include sodium lauryl sulfate, sodium sulfosuccinates such as sodium dimethylamyl sulfosuccinate, sodium dodecyl diphenylether disulfonate and the like. The amount of emulsifier present is sufficient to obtain an aqueous emulsion of the monomers. Such an amount is typically from about 0.5 to 5 parts by weight per 100 parts by weight of the total amount of monomers added. Other surfactants that may be utilized include those identified in Surface Active Agents, Schwartz and Perry, Vol. I, Interscience Publishers, Inc., New York, 1958; Surface Activity, Moilet, Collie and Black, D. Van Nostrand Company, Inc. New York, 1961; Organic Chemistry, Feiser and Feiser, D.C. Heath and Company, Boston, 1944; and The Merck Index, Seventh Edition, Merck & Co., Inc., Rahway, N.J., 1960 all of which are hereby incorporated by reference.

Chelating agents may also be used during polymerization to tie up various metal impurities as well as to achieve a uniform polymerization. Examples of specific chelating agents include ethylene diamine tetra-acetic acid, nitrilotriacetic acid, citric acid, and their ammonium, potassium and sodium salts. The amounts of the chelating agents may range from about 0.05 to 0.5 parts by weight per 100 parts by weight of the total amount of monomers added.

To reduce the formation of coagulum during the polymerization and provide a high monomer conversion, the pH of the polymerization reaction is controlled in a narrow range of about 5 to about 8. A high monomer conversion is a monomer conversion greater than about 95% conversion, preferably greater than about 97% conversion. The coagulum is the portion of latex polymer remaining after passing the latex polymer through a filter of less than about 100 mesh, preferably approximately 60 mesh, and then drying and weighing the amount remaining which does not pass through the filter. It will be appreciated that coagulum is undesirable because coagulum can effect viscosity, filterability and uniformity of the coating formulation as well uniformity of the dried coating. The ideal coagulum level is zero.

The pH of the polymerization reaction is controlled by addition of a base or preferably, a suitable buffer, or a mixture thereof, before initiation of the polymerization reaction and then the desired pH range is maintained throughout the polymerization process. Examples of specific bases and buffers include potassium hydroxide, sodium bicarbonate and ammonium acetate and the like. The amount of base or buffer added to the polymerization reaction is adjusted to obtain the desired pH range as is well known in the art.

The polymerization process is effected by the selective addition of aliphatic conjugated diene monomer, monoolefinic monomer, acid functional monomer and amine functional monomer in a batch wise addition in one or more steps to a reaction zone of a reactor of a type well known in the art used in the emulsion polymerization process. In a preferred embodiment, the polymerization process is effected by copolymerizing a monomeric mixture of the acid functional monomer and the amine functional monomer with styrene and butadiene.

The process includes the step of first charging into a reaction zone of the reactor, water and a surfactant, and then adding a buffer or base of a type previously discussed. Subsequently, monoolefinic monomer, acid functional monomer and amine functional monomer of a type previously discussed are added to the reactor. Next, water and polymerization catalyst are added and then aliphatic conjugated diene monomer of a type previously discussed are added to the reactor and allowed to react to completion.

If desired, the latex prepared above may be used as a seed to polymerize additional amounts of monomeric mixture to further increase the latex solids. For example, the prepared latex may be added to a reactor and then a suitable surfactant may be added.

After addition of the surfactant, a buffer, monoolefinic monomer, acid functional monomer, amine functional monomer and additional surfactant of a type previously discussed are charged to the reactor. Water and polymerization catalyst are then added followed by aliphatic conjugated diene monomer of a type previously discussed and allowed to react to completion.

Polymerization is generally carried out from about 120° F. to 200° F., and preferably at about 149° F. Polymerization is generally conducted for about 10 to 24 hours, however polymerization conditions may vary as desired to provide different conversion levels of monomer to copolymer. The emulsion polymerizable mixture is then allowed to react in the reactor to about 40 to about 55 percent solids at which time about 97 percent of the monomer has been converted.

An initiator, defoamer and sodium hydroxide may be added to the latex and stripped until the residual monoolefinic monomer is about 0.05% or less. After stripping, a suitable biocide well known in the art may be added.

One application of the polymer binder latices in accordance with the present invention is in coatings for paper, especially paper intended for web offset printing which requires a particular combination of strength and blister resistance. The coating formulations of this invention include an aqueous medium, an amount of a finely divided mineral filler and the latex. Examples of mineral fillers include those known in the art such as kaolin clay, satin white, calcium carbonate, titanium oxide, etc. The amount of filler which is employed can vary, depending upon the density of the filler and the coating properties desired. Typically, coating formulations are comprised mainly of filler particles and about 2 to about 25, preferably about 8 to about 16, parts of latex polymer for 100 parts of filler by weight. Each of the aforementioned components is mixed in an aqueous medium to yield a formulation which is about 40 to about 70 percent solids by weight, and preferably about 55 to about 68 percent solids by weight. It is understood that other additives known in the art which include cobinders (e.g., starch, casein, protein, polyacrylate, polyvinyl alcohol), thickeners, cross-linking agent, a stabilizer, an anti-foaming agent, a surfactant, water retention aids and the like may be added to the coating formulation.

The coating formulations as described herein may be applied to a paper sheet through most any suitable coating device. For example, suitable methods of applying a latex coating to the paper include blade coaters, air knife coaters, rod coaters, roll coaters, and the like. For a more detailed discussion of various coating devices reference is made to U.S. Pat. No. 4,474,860 and Coating Equipment and Processes, O.L. Booth, Lockwood Publishing Co., Inc., 1970.

Without wishing to be bound by any theory of operability, it is believed that the balance of blister resistance and strength for the paper coating in accordance with the present invention is achieved because of the presence of functional monomer pairs in each polymer molecule which provide thermally labile crosslinks, i.e., monomer pairs which have a negative thermal coefficient of interaction. Certain acid-base complexes including hydrogen bonded complexes are examples of these types of interactions. The balance of blister resistance and strength is believed to be achieved by the presence of amine functional and acid functional monomers in each latex polymer molecule.

The invention will be further clarified by a consideration of the following examples, which are intended to be purely exemplary of the invention.

EXAMPLES

Polymerization reactions further described below were conducted in one quart size glass bottles in a constant temperature water bath. The ingredients were added in the order listed below in Table 1. The bottles were purged with nitrogen before the addition of butadiene. Following the addition of butadiene, the bottles were capped and placed in the constant temperature bath on a rotating rack and allowed to react to completion. The progress of the polymerization reaction was monitored by measuring the pressure in the bottle at various times. The polymerization reactions were considered complete when the bottle pressure had decreased to at least −17 inches of mercury (in. Hg).

After completion of the polymerization reactions, the bottles were removed from the bath, cooled to room temperature and the contents filtered through a fine paint filter (approximately 60 mesh) commercially available from the Glidden Co. The coagulum collected in the filter was dried to constant weight and was reported as parts per hundred monomers (pphm). The percent solids content of the filtered latex was determined gravimetrically and used to calculate the percent monomer conversion. The number average particle size (diameter) of latices was measured by Capillary Hydrodynamic Fractionation (CHDF).

Example 1

Table 1 shows the recipes for a set of latices where potassium hydroxide, sodium bicarbonate or ammonium acetate was used to adjust the pH of the polymerization reaction mixture before the start of polymerization. The polymerization reactions were conducted over about 18 hours at about 65° C. After 18 hours the bottles which used potassium hydroxide for pH adjustment showed positive gauge pressure indicating that conversion was significantly below 100%. Accordingly, the sample identified as latex 1 was discarded and no further testing was performed. The bottles containing the recipes which used a buffer for pH adjustment showed vacuum (−20 to −22 in. Hg pressure) thus indicating higher conversion.

The properties of the latices are listed at the bottom of Table 1. The properties of latex 1 were not determined because the level of conversion was low. However, it will be appreciated that latex 1 may be acceptable given additional monomer reaction time. Monomer conversion for latices 2 and 3 was greater than 98% and stable latices with low coagulum, generally <1% by weight, were obtained. As used herein "stable latices" refers to latices which do not coagulate further on storage at room temperature for up to 6 months.

TABLE 1

|  | latex 1 (grams) | latex 2 (grams) | latex 3 (grams) |
|---|---|---|---|
| INGREDIENTS |  |  |  |
| solution A[1] | 300.0 | 300.0 | 300.0 |
| KOH (5%) | 2.4 | — | — |
| NaHCO$_3$ (5%) | — | 6.8 | — |
| Ammonium acetate (5%) | — | — | 7.2 |
| solution B[2] | 62.0 | 62.0 | 62.0 |
| solution C[3] | 30.6 | 30.6 | 30.6 |
| butadiene | 40.0 | 40.0 | 40.0 |
| Total | 435.0 | 439.4 | 439.8 |
| PROPERTY |  |  |  |

TABLE 1-continued

|  | latex 1 (grams) | latex 2 (grams) | latex 3 (grams) |
|---|---|---|---|
| pH | — | 5.84 | 5.24 |
| solids (%) | — | 23.7 | 24.0 |
| coagulum (pphm) | — | 0.1 | 0.1 |
| conversion (%) | — | 98.0 | 99.0 |
| particle size (nm) | — | — | 155 |

[1] solution A contains 290.0 gm deionized water, 6.0 gm Monawet MB-45 (45%) commercially available from Mona Industries, Inc. (diisobutyl sodium sulfosuccinate) and 4.0 gm Dowfax 2A1 (45%) commercially available from Dow Chemical Inc. (sodium dodecyl diphenylether disulfonate).
[2] solution B contains 57.0 gm styrene, 1.0 gm 2-vinylpyridine, 2.0 gm methacrylic acid and 2.0 gm Sulfole 120 (tertiary dodecyl mercaptan) commercially available from Phillips Petroleum.
[3] solution C contains 30.0 gm deionized water and 0.6 gm $K_2S_2O_8$.

Example 2

The preparation of latices with recipes identical to those for latices 1 and 2 were repeated with the exception that the amount of base potassium hydroxide or sodium bicarbonate was increased by 50%. The polymerizations were conducted for 22 hours at 65° C. At the end of the polymerization reaction, both bottles had a vacuum (−22 in. Hg for latex 4 and −18 in. Hg for latex 5). The properties of the latices are provided in Table 2. Both latices had very low coagulum.

As shown in Table 2, by controlling the pH during polymerization, even with a base, latices with low coagulum levels can be prepared.

TABLE 2

|  | latex 4 (grams) | latex 5 (grams) |
|---|---|---|
| INGREDIENTS |  |  |
| solution A[1] | 300.0 | 300.0 |
| KOH (5%) | 3.6 | — |
| NaHCO$_3$ (5%) | — | 10.2 |
| solution B[2] | 62.0 | 62.0 |
| solution C[3] | 30.6 | 30.6 |
| butadiene | 40.0 | 40.0 |
| Total | 436.2 | 442.8 |
| PROPERTY |  |  |
| pH | 5.41 | 5.96 |
| solids (%) | 23.5 | 24.3 |
| coagulum (pphm) | 0.05 | 0.05 |
| conversion (%) | 97 | 100 |
| particle size (nm) | 185 | 115 |

[1] solution A contains 290.0 gm deionized water, 6.0 gm Monawet MB-45 (45%) and 4.0 gm Dowfax 2A1 (45%).
[2] solution B contains 57.0 gm styrene, 1.0 gm 2-vinylpyridine, 2.0 gm methacrylic acid and 2.0 gm Sulfole 120.
[3] solution C contains 30.0 gm deionized water and 0.6 gm $K_2S_2O_8$.

Example 3

Latices 3, 4 and 5 were used as seeds to polymerize additional amounts of styrene, butadiene and methacrylic acid and 2-vinylpyridine to further increase the latex solids. The composition of the polymerization reactions are provided in Table 3.

TABLE 3

|  | latex 6 (grams) | latex 7 (grams) | latex 8 (grams) |
|---|---|---|---|
| INGREDIENT |  |  |  |
| latex 4 | 308.6 | — | — |
| latex 5 | — | 319.2 | — |
| latex 3 | — | — | 300.0 |
| Dowfax 2A1 (45%) | 1.0 | 1.0 | 1.0 |
| KOH (5%) | 4.1 | — | — |
| NaHCO$_3$ (5%) | — | 11.5 | — |
| Ammonium acetate (5%) | — | — | 12.4 |
| solution D[4] | 70.5 | 70.5 | 70.5 |
| solution C[3] | 30.6 | 30.6 | 30.6 |
| butadiene | 45.0 | 45.0 | 45.0 |
| TOTAL | 459.8 | 477.8 | 472.1 |
| PROPERTY |  |  |  |
| pH | 5.77 | 6.15 | 5.28 |
| solids (%) | 40.7 | 40.5 | 40.2 |
| coagulum (pphm) | 3.50 | 1.73 | 1.51 |
| conversion (%) | 99 | >99 | 99 |
| particle size (nm) | 253 | 169 | 212 |

[4] solution D contains 65.0 gm styrene, 1.1 gm 2-vinylpyridine, 2.2 gm methacrylic acid and 2.2 gm Sulfole 120.

The bottle pressures were −20 in. Hg, −17 in. Hg and −21 in. Hg, after 18 hours at 65° C. and −21 in. Hg, −17 in. Hg and −21 in. Hg after 22 hours at 65° C., respectively, for latices 6, 7 and 8. The use of potassium hydroxide for pH adjustment gave a higher amount of coagulum than when pH buffers were used. The particle size of latices 6, 7 and 8 determined experimentally was in agreement with the corresponding value calculated from the diameter of seed latices, the amount of seed and the amount of additional monomer added. This suggests that no new latex particles were nucleated in this polymerization step.

Example 4

Latices 3-8 were evaluated as binders in a web offset paper coatings formulation containing on a dry basis, 16 parts of latex, 75 parts No. 1 Clay (Hydrafine commercially available from J. M. Huber), 25 parts ground CaCo$_3$ (Hydracarb 90 commercially available from Omya, Inc.), 0.05 parts tetrasodium pyrophosphate, 0.15 part Dispex N-40 (acrylic polymer in aqueous solution commercially available from Allied Colloids Inc.), 1.0 part calcium stearate (Nopcote C-104 commercially available from Henkel Corporation) and 0.5 part Sunrez 700M crosslinker (urea resin crosslinker commercially available from Sequa Chemicals, Inc.) The coating solids were about 56.3 to 56.8% and the pH was about 9.0 adjusted with ammonia. As a control, a carboxylated styrene-butadiene latex containing 40 pphm butadiene, 56.25 pphm styrene and 3.75 vinyl acid monomers but no vinylpyridine or other amine monomers was used. The coat weight was 10 lbs./3300 sq.ft./side.

The blister resistance of coated paper was measured with a hot oil bath noting the lowest bath temperature at which the coated paper formed blisters. The coating binding strength (Wet and Dry Pick) was measured using IGT Pick testing and by IGT Wet Pick testing according to standard methods of measurement by the Technical Association of the Pulp and Paper Industry (TAPPI) as well known in the art. A measure of dry and wet binding strength is provided by IGT Pick testing pursuant to TAPPI Useful Method UM 591, Surface Strength of Paper. The IGT dry pick strength measures the speed, in cm/sec, required to lift the paper coating off of the surface of a paper strip when printed using an ink roller and standard conditions as described in UM 591. Higher numbers indicate better resistance to picking when the paper is being commercially printed in an offset press. When the paper sample is being wetted with water prior to testing in the IGT tester the test is referred to as the IGT Wet Pick.

The blister resistance and strength properties of coatings made with the binders of the present invention were compared with the control and are provided in Table 4.

TABLE 4

| Latex | Blister Temperature (°C.) | Wet Pick (IGT) Rating[5] | Dry Pick (IGT) (cm/sec) |
|---|---|---|---|
| 4 | 190 | 2.0 | 39 |
| 6 | 175 | 1.0 | 48 |
| 5 | 200 | 1.5 | 39 |
| 7 | 205 | 1.0 | 46 |
| 3 | 195 | 2.3 | 43 |
| 8 | 190 | 1.0 | 43 |
| control | 175 | 2.0 | 51 |

[5]on a scale of 1.0–7.0. A rating of 1.0 indicates no coating removal and 2.0 indicates some coating removal. A rating of 7.0 indicates large amounts of coating removal.

As shown in Table 4, the binders of the present invention, especially those where a buffer was used to control pH during polymerization (latices 4, 5, 6 and 7), provided superior blister resistance at comparable or superior wet pick relative to those for the control carboxylated styrene-butadiene latex which does not contain the amine monomer. Although the dry pick for the binders of the present invention is equal to or marginally below that of the control, it is believed adequate for web offset printing applications. For web offset printing applications wet pick rating and blister temperature resistance are more important than dry pick.

The documents, patents and patent applications referred to herein are hereby incorporated by reference.

Having described presently preferred embodiments of the present invention, it is to be understood that it may be otherwise embodied within the scope of the appended claims.

What is claimed is:

1. A process of preparing a latex binder for paper coating formulations comprising:
   copolymerizing a monomeric mixture including an acid functional monomer, an amine functional monomer, a conjugated diene monomer and alkenyl aromatic monomer;
   controlling the pH of the polymerization reaction between about 5 to about 8 to provide a latex polymer binder containing copolymerized acid functional and amine functional monomers in each polymer molecule.

2. The process of claim 1 wherein the pH of the polymerization reaction is controlled by adding a base before initiating the polymerization reaction.

3. The process of claim 1 wherein the pH of the polymerization reaction is controlled by adding a buffer before initiating the polymerization reaction.

4. The latex binder of claim 1 wherein the acid functional monomer is selected from the group consisting of vinyl acids and vinyl phenols.

5. The latex binder of claim 1 wherein the acid functional monomer is selected from the group consisting of (meth) acrylic acid, p-hydroxy styrene and mixtures thereof.

6. The latex binder of claim 4 wherein the acid functional monomer is used in an amount of about 0.5 to about 10% by weight of the total amount of monomer added.

7. The latex binder of claim 4 wherein the acid functional monomer is used in an amount of about 1 to about 8% by weight of the total amount of monomer added.

8. The latex binder of claim 1 wherein the amine functional monomer is selected from the group consisting of vinylpyridines, vinylpyrrolidones, alkylamino alkylesters and vinylbenzylamine.

9. The latex binder of claim 1 wherein the amine functional monomer is selected from the group consisting of 2-vinylpyridine, 4-vinylpyridine and 2-methyl-5-vinylpyridine, 1-vinyl-2-pyrrolidone, dimethylaminoethylmethacrylate and diethylaminoethylmethacrylate and mixtures thereof.

10. The latex binder of claim 8 wherein the amine functional monomer is used in an amount of about 0.5 to about 10% by weight of the total amount of monomer added.

11. The latex binder of claim 8 wherein the amine functional monomer is used in an amount of about 1 to about 5% by weight of the total amount of monomer added.

12. The latex binder of claim 1 wherein the aliphatic conjugated diene monomer is selected from the group consisting of piperylene, isoprene, 2,3-dimethyl-1,3-butadiene, and 1,3-butadiene and mixtures thereof.

13. The latex binder of claim 12 wherein the aliphatic conjugated diene monomer is used in an amount of about 25 to about 75% of the total amount of monomers.

14. The latex binder of claim 12 wherein the aliphatic conjugated diene monomer is used in an amount of about 30 to about 60% by weight of the total amount of monomers.

15. The latex binder of claim 1 wherein the alkenyl aromatic monomer is selected from the group consisting of styrene, α-methyl styrene, p-tertiary butyl styrene, methyl vinyl toluene, p-vinyl toluene, 3-ethyl styrene and mixtures thereof.

16. The latex binder of claim 15 wherein the alkenyl aromatic monomer is used in an amount of about 30 to about 75% by weight of the total amount of monomer added.

17. The latex binder of claim 15 wherein the alkenyl aromatic monomer is used in an amount of about 35 to about 70% by weight of the total amount of monomer added.

* * * * *